US008102635B2

(12) United States Patent
Hällström et al.

(10) Patent No.: US 8,102,635 B2
(45) Date of Patent: Jan. 24, 2012

(54) METHOD AND ARRANGEMENT FOR TRIGGERING A SERIES SPARK GAP

(75) Inventors: Jari Hällström, Nummela (FI); Tarmo Känsälä, Tampere (FI); Heikki Holm, Tampere (FI)

(73) Assignee: Alstom Grid Oy, Tampere (FI)

(*) Notice: Subject to any disclaimer, the term of this patent is extended or adjusted under 35 U.S.C. 154(b) by 705 days.

(21) Appl. No.: 11/988,013

(22) PCT Filed: Jun. 29, 2006

(86) PCT No.: PCT/FI2006/050296

§ 371 (c)(1), (2), (4) Date: Dec. 18, 2008

(87) PCT Pub. No.: WO2007/003706

PCT Pub. Date: Jan. 11, 2007

(65) Prior Publication Data

US 2009/0213504 A1 Aug. 27, 2009

(30) Foreign Application Priority Data

Jul. 1, 2005 (FI) .................................... 20055377

(51) Int. Cl.
*H02H 1/00* (2006.01)

(52) U.S. Cl. ....................................... 361/130; 361/117

(58) Field of Classification Search .................. 361/130, 361/117

See application file for complete search history.

(56) References Cited

U.S. PATENT DOCUMENTS 2,795,738 A 6/1957 Holliday (Continued)

FOREIGN PATENT DOCUMENTS

JP 06132086 A * 5/1994

OTHER PUBLICATIONS

Tou T. Y. et al., IEEE Transactions on Plasma Science, Dec. 1993, vol. 21, ISSN 0093-3813, pp. 696-700.

Osmokrovid P. et al., Pulsed Power Conference, Jul. 3-6, 1995, IEEE, vol. 2, ISBN 0-7803-2791-8, pp. 822-827.

Osmokrovid, P.et al., Eighth IEEE International Pulse Power Conference, 1991. Digest of Technical Papers, Jun. 16-19, 1991, pp. 859-862.

*Primary Examiner* — Rexford Barnie
*Assistant Examiner* — Scott Bauer
(74) *Attorney, Agent, or Firm* — Birch, Stewart, Kolasch & Birch, LLP

(57) ABSTRACT

A series spark gap is triggered such that in parallel with partial spark gaps (1, 2) of the series spark gap there are coupled first voltage distribution means. Further, at least in one partial spark gap (1, 2) there is arranged an additional electrode (10) whose voltage is set to a given level by means of second voltage distribution means. The voltage level of the additional electrode (10) is changed by disturbing the voltage distribution of the second voltage distribution means. Thus the spark gap between the main electrode (6*a*, 6*b*) of the partial spark gap (1) and the additional electrode (10) will be ignited. Capacity of the second voltage distribution means is lower than that of the first voltage distribution means and consequently the voltage acting over the first voltage distribution means does not change significantly. Thus the voltage determined by the first voltage distribution means acts over the spark gap that is between the additional electrode (10) and the second main electrode (6*a*, 6*b*) of the partial spark gap (1) and that will also ignite, which further results in the supply voltage (U) acting only over the second partial spark gap (2), whereby a spark-over will also occur therein.

12 Claims, 2 Drawing Sheets

U.S. PATENT DOCUMENTS

| | | | | | |
|---|---|---|---|---|---|
| 4,198,668 | A | * | 4/1980 | Bergdahl et al. | 361/8 |
| 4,625,254 | A | * | 11/1986 | Fahlen | 361/16 |
| 4,652,963 | A | * | 3/1987 | Fahlen | 361/16 |
| 4,703,385 | A | | 10/1987 | Stenstrom et al. | |
| 4,860,156 | A | | 8/1989 | Stenstrom et al. | |
| 4,890,180 | A | * | 12/1989 | Paulsson | 361/16 |
| 5,233,498 | A | * | 8/1993 | Kansala | 361/130 |
| 5,995,352 | A | * | 11/1999 | Gumley | 361/111 |
| 7,663,856 | B2 | * | 2/2010 | Breuer et al. | 361/120 |

* cited by examiner

METHOD AND ARRANGEMENT FOR TRIGGERING A SERIES SPARK GAP

BACKGROUND OF THE INVENTION

The invention relates to a method for triggering a series spark gap, in which there are in series at least two partial spark gaps, and supply voltage is distributed over the partial spark gaps by means of first voltage distribution means.

The invention also relates to an arrangement for triggering a series spark gap, the series spark gap comprising at least two partial spark gaps in series, and the arrangement comprising first voltage distribution means for distributing supply voltage over the partial spark gaps.

For instance, in connection with high-voltage lines there are employed series capacitor batteries to compensate for line inductance. In parallel with the capacitor battery, in protection thereof, there is generally coupled a metal oxide varistor and/or a spark gap. The current-voltage characteristic of the metal oxide varistor is highly non-linear and as battery current rises, the metal oxide varistor limits capacitor voltage. A typical limiting voltage $U_{lim}$ is 2.3 pu=2.3 Un, i.e. 2.3 times the nominal capacitor voltage (case-specifically the voltage may also be selected to be something else). This voltage passes over the capacitor with the maximum short-circuit current of the line. In a line short circuit the metal oxide varistor protects the capacitor by limiting its voltage to the value 2.3 pu. Thus, some of the current in the line passes through the metal oxide varistor that gets warm. In parallel with the capacitor and the metal oxide varistor there is coupled a so-called forced-triggered spark gap that is ignited if the varistor heats excessively. If the short circuit occurs in the same line sector where the series capacitor is located, forced-triggering of the spark gap is always attempted. Due to spark gap settings the typical lowest voltage at which the forced-triggering of the spark gap will succeed is about 2 pu using the conventional technology.

In a line short circuit line breakers switch the current off. If the line short circuit current is low, the varistor voltage does not always rise to the value 2 pu or higher. In that case the forced-triggering of the spark gap will not succeed. In case the capacitor battery has not been bypassed with a spark gap prior to opening the line breakers, a transient recovery voltage TRV of the line breakers rises. Therefore it is necessary for the forced-triggering of the spark gap to succeed with lower line current and capacitor voltage than 2 pu. A typical empirical requirement is about 1.7 to 1.8 pu.

SE publication 8 205 236 discloses an arrangement for forced triggering of a spark gap. The arrangement employs a separate pulse transformer that feeds a high-voltage pulse igniting the spark gap. By means of the high-voltage pulse there is ignited one of the auxiliary spark gaps arranged in parallel with the main spark gap, whereby these auxiliary spark gaps will be ignited eventually triggering the main spark gaps. It is necessary, however, to synchronize the ignition pulse with spark gap voltage so as to enable forced triggering. The synchronization and generation of energy needed by a high-voltage pulse and supply thereof to the pulse transformer require suitable means. These means make the structure of the forced-triggering device complicated, increase its costs and liability to damage and thus undermine the overall reliability of the forced-triggering device.

FI patent 80812 discloses an arrangement for forced-triggering a spark gap with voltage lower than autoignition. The spark gap is divided into at least two partial spark gaps in series. In parallel with the partial spark gaps there are coupled capacitors to provide mutual voltage distribution of the partial spark gaps. In series with the capacitors there is arranged a member controllably adopting a low impedance or high impedance state. On shifting to the high impedance state said member changes the mutual voltage distribution of the spark gaps such that the partial spark gap in parallel therewith ignites. The member adopting a high impedance or a low impedance state is a transformer, for instance. Strength of said member leaves a great deal to be desired. Moreover, the arrangement does not necessarily operate sufficiently fast.

There is further known an arrangement according to FIG. 1 for triggering a series spark gap. In the solution of FIG. 1 the main spark gap is divided into two partial spark gaps in series, i.e. a first partial spark gap 1 and a second partial spark gap 2. In parallel with the first partial spark gap 1 there are coupled capacitors Ca and Cb. In parallel with the second partial spark gap 2 there is coupled a capacitor Cc. The capacitors Ca, Cb and Cc are designed such that in a normal situation they distribute the voltage such that there is an equal voltage over both partial spark gaps 1 and 2. In parallel with the capacitor Cc there is coupled a first auxiliary spark gap 3. In series with the first auxiliary spark gap 3 there is coupled a first current limiting resistor R1. In parallel with the capacitor Cb there is coupled a second auxiliary spark gap 4 and in series therewith there is coupled a second current limiting resistor R2. The auxiliary spark gaps 3 and 4 are gas-pressure spark gaps, i.e. trigatrons. They are hermetically closed, and therefore their autoignition voltage is constant, in principle. There is, however, a slight spread in their ignition voltage, and thus, to be on the safe side, their autoignition voltage is set to a value that is about 10% higher than the highest voltage over them, which is 2.3 pu/4=0.575. In said example the setting is thus 1.1*2.3/4=0.633 pu. When the series spark gap is to be triggered, the procedure is as follows. A trigger pulse is fed to the first auxiliary spark gap. This provokes ignition in the first spark gap, and consequently the capacitor Ca is discharged through the current limiting resistor R1. The voltage is then distributed such that one third of the voltage acting over the whole arrangement acts over the capacitor Cb and thus over the second auxiliary spark gap 4.

Autoignition voltage of the second auxiliary spark gap is set to value 1.1*2.3/4=0.633 pu. This voltage passes over said second auxiliary spark gap if the voltage acting over the whole spark gap is 3*0.633 pu=1.9 pu. In view of the tolerance of the auxiliary spark gap the required voltage over the whole spark gap is 2 pu.

In series with the current limiting resistor R1 there is a transformer 5 that gives a trigger pulse to the second auxiliary spark gap 4. The trigger pulse expedites ignition, but does not necessarily decrease the ignition voltage, because the trigger pulse has very short duration. When the second auxiliary spark gap 4 ignites, the capacitor Cb discharges through the resistance R2. This results in the whole voltage acting over the second partial spark gap that will ignite. Thereafter the first partial spark gap will also ignite.

Autoignition of the auxiliary spark gaps 3 and 4 may not be set excessively low so that they would not ignite on their own without forced triggering. As described above, the whole spark gap will be ignited at voltage 2.0 pu, if the limiting voltage of the varistor is 2.3 pu. In all cases the value 2.0 pu is not sufficiently low, however. The arrangement is also relatively complicated and consequently expensive.

BRIEF DESCRIPTION OF THE INVENTION

The object of the present invention is to provide a method and an arrangement of a novel type for triggering a series spark gap.

The method of the invention is characterized by arranging an additional electrode in at least one partial spark gap between main electrodes thereof, setting voltage of the additional electrode to a given level by means of second voltage distribution means, arranging the capacity of the second voltage distribution means to be lower than the capacity of the first voltage distribution means and triggering the series spark gap by disturbing voltage distribution of the second voltage distribution means, whereby the spark gap between the main electrode of the partial spark gap and the additional electrode will ignite, and consequently the voltage determined by the first voltage distribution means acts over the spark gap that is between the additional electrode and the second main electrode of the partial spark gap and that will also ignite, which further leads to the fact that supply voltage only acts over the second partial spark gap, and consequently a spark-over also occurs therein.

The arrangement of the invention is further characterized by comprising an additional electrode arranged in at least one partial spark gap between main electrodes thereof, second voltage distribution means for setting voltage of the additional electrode to a given level, the capacity of the second voltage distribution means being lower than the capacity of the first voltage distribution means, and means for disturbing voltage distribution of the second voltage distribution means.

The basic idea of the invention is that the arrangement comprises at least two partial spark gaps in series. In parallel with the partial spark gaps there are coupled first voltage distribution means. In at least one partial spark gap there is arranged an additional electrode whose voltage is set to a given level by means of second voltage distribution means. The voltage level of the additional electrode is changed by disturbing the voltage distribution of the second voltage distribution means. Thus the spark gap between the electrode of the partial spark gap and the additional electrode will be ignited. The capacity of the second voltage distribution means is clearly lower than the capacity of the first voltage distribution means and consequently the voltage acting over the first voltage distribution means will not change significantly. So, the voltage determined by the first voltage distribution means only acts over the spark gap which is between the second additional electrode and the electrode of the partial spark gap and which will also ignite. This leads further to the whole supply voltage acting over the second partial spark gap alone, whereby a spark-over also occurs therein. The disclosed solution permits ignition of the partial spark gaps with voltage that is considerably lower than their autoignition voltage. Consequently it is possible to protect other components very efficiently and reliably with the spark gap. The basic idea of one embodiment is that voltage distribution of voltage distribution means is disturbed by short-circuiting a gap between poles of one voltage distribution means in the second voltage distribution means, for instance, by means of a gas-pressure spark gap, i.e. a trigatron. The basic idea of a second embodiment is that voltage distribution of others is disturbed by feeding a current pulse by means of a pulse transformer. This leads to a change in the voltage of the additional electrode and further to a spark-over.

BRIEF DESCRIPTION OF THE DRAWINGS

In the following the invention will be described in greater detail in connection with the attached drawings, in which.

For the sake of clarity the invention is shown in a simplified manner in the figures. Like reference numerals refer to like parts in the figures.

DETAILED DESCRIPTION OF SOME EMBODIMENTS OF THE INVENTION

Figure 1:
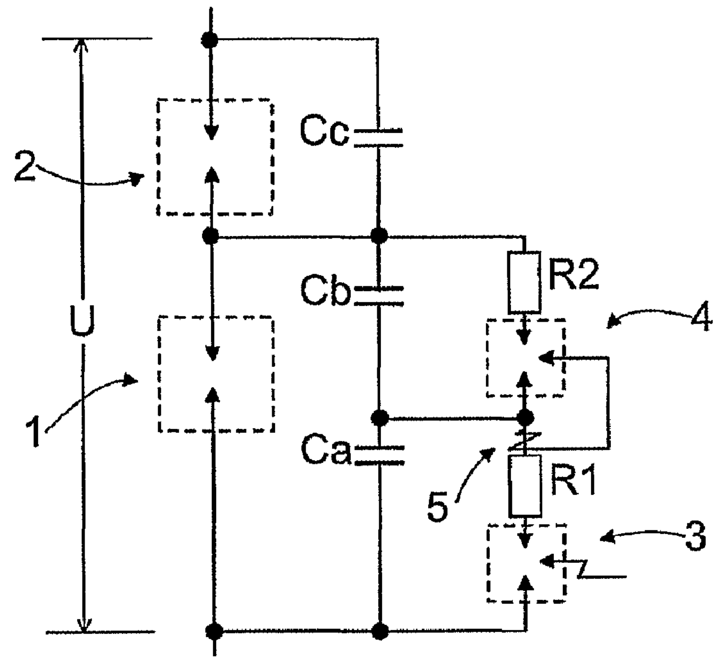
FIG. 1 PRIOR ART
FIG. 1 shows a prior art arrangement for triggering a series spark gap.
Figure 2:
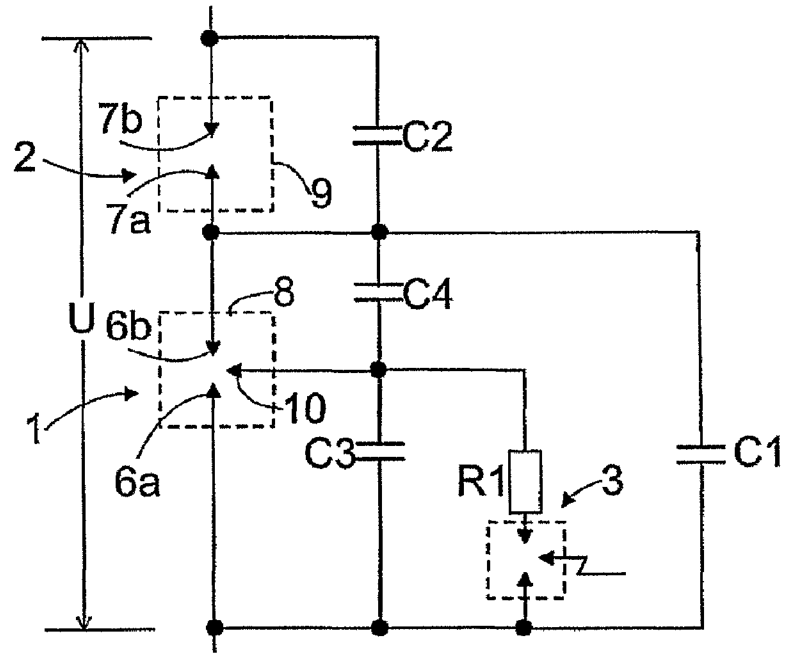
FIG. 2 shows a solution in accordance with an embodiment of the invention for triggering a series spark gap.

FIG. 2 shows a solution, in which a main spark gap is divided into two partial spark gaps in series, i.e. into a first partial spark gap 1 and a second partial spark gap 2. In parallel with the first partial spark gap there is coupled a capacitor C1. In parallel with the second partial spark gap there is coupled a capacitor C2. These so-called first capacitors C1 and C2 are designed in this example such that in a normal situation they distribute the voltage in equal amounts over each one of the partial spark gaps 1 and 2.

In the first partial spark gap 1 there are main electrodes 6*a* and 6*b* in a manner known per se. Correspondingly, in the second partial spark gap 2 there are main electrodes 7*a* and 7*b*. Further, the first partial spark gap 1 is arranged in a housing 8. The second partial spark gap 2 is also arranged in a housing 9 in a manner known per se.

Apart from the main electrodes 6*a* and 6*b* there is an additional electrode 10 in the first partial spark gap 1. The distance between the main electrode 6*a* and the additional electrode 10 is shorter than the distance between the main electrodes 6*a* and 6*b*. Preferably the additional electrode 10 is arranged such that its distance from the main electrodes 6*a* and 6*b* is about half, or less, of the distance between the main electrodes 6*a* and 6*b*. The arrangement further comprises second capacitors C3 and C4, by which the voltage of the additional electrode 10 is set to a desired level in a normal situation. The structure constituted by the main electrodes 6*a* and 6*b* and the additional electrode 10 may be symmetrical, and consequently the second capacitors C3 and C4 are equal. The second capacitors C3 and C4 maintain the voltage of the additional electrode 10 halfway between the voltages of the main electrodes 6*a* and 6*b* such that the electric field strength between the main electrode 6*a* and the additional electrode 10 is equal to that between the main electrode 6*b* and the additional electrode 10. If the structure is not symmetrical, i.e. said gaps are not equal, the values of the capacitors C3 and C4 are designed such that the field strength is equal in both gaps.

Typically the distances between the first partial spark gap 1 and the second partial spark gap are formed such that the field strengths are equal. The first capacitors C1 and C2 are typically equal in size, whereby the voltage is distributed evenly between each partial spark gap 1 and 2 in a normal situation. Even in this case, if the partial spark gaps 1 and 2 are formed different, the capacitances bf capacitors C1 and C2 are designed such that the field strength in each partial spark gap 1 and 2 is equal.

The spark gaps are designed to endure normal operating voltage. Typically the spark gaps are designed such that autoignition of the partial spark gaps 1 and 2 occurs, for instance, the voltage being 75% of the supply voltage $U_{lim}$ to which the metal oxide varistor limits the voltage. Typically this voltage $U_{lim}=2.3\times U_N$, where $U_N$ is the nominal voltage.

The series spark gap shown in FIG. 2 allows forced triggering with a voltage lower than the above-mentioned autoignition voltage such that voltage distribution provided by the second capacitors C3 and C4, i.e. the voltage level of the additional electrode 10, is disturbed sufficiently. In the case of FIG. 2 the voltage distribution is disturbed by means of an auxiliary spark gap 3. The auxiliary spark gap 3 is a gas-pressure spark gap, i.e. a trigatron. By means of the auxiliary spark gap 3 the spark gap between the main electrode 6*a* and the additional electrode 10 and the capacitor C3 in parallel therewith are thus short-circuited. For instance, an ignition coil or a semiconductor switch may be used for triggering the auxiliary spark gap 3 in a manner known per se. The current limiting resistor R1 that is in series with the auxiliary spark gap 3 limits the current passing through the auxiliary spark gap 3.

When the auxiliary spark gap 3 has been triggered, the capacitor C3 will discharge. Further, the voltage level of the additional electrode 10 decreases and part of the supply voltage U determined by the capacitor C1 acts over the additional electrode 10 and the main electrode 6*b*. In a symmetrical case said voltage is thus about half of the supply voltage U. Thus a spark-over occurs between the main electrode 6*b* and the additional electrode 10. The capacitor C4 in parallel with said spark gap then discharges. The capacitances of the capacitors C3 and C4 are significantly lower than that of the capacitor C1. So the voltage over the capacitor C1 does not reduce considerably. Said voltage acts now between the additional electrode 10 and the main electrode 6*a*, whereby a spark-over also occurs in said spark gap. This in turn will result in the supply voltage U acting almost completely over the second spark gap 2, whereby a spark-over will also occur therein.

Thus, the operation of the arrangement requires that the capacitance in series connection of the capacitors C3 and C4 be lower than that of the capacitor C1. Preferably the capacitance of the capacitor C1 is more than twice higher than the capacitance in series connection of the capacitors C3 and C4. According to a preferred embodiment the capacitance of the capacitor C1 is more than five times higher than that in series connection of the capacitors C3 and C4. Particularly preferably the capacitance of the capacitor C1 is more than ten times higher than that in series connection of the capacitors C3 and C4.

It may be mentioned in some numerical values that the nominal value $U_N$ of the supply voltage U may be, for instance, in the order of 40 kilovolts. The capacitance of the capacitors C1 and C2 may be 1.5 nanofarad, for instance, and the capacitance of the capacitors C3 and C4 may then be less than 1 nanofarad, for instance. The distance between the main electrodes 6*a* and 6*b* and the distance between the main electrodes 7*a* and 7*b* may be in the order of 15 to 20 mm, for instance.

Figure 3:
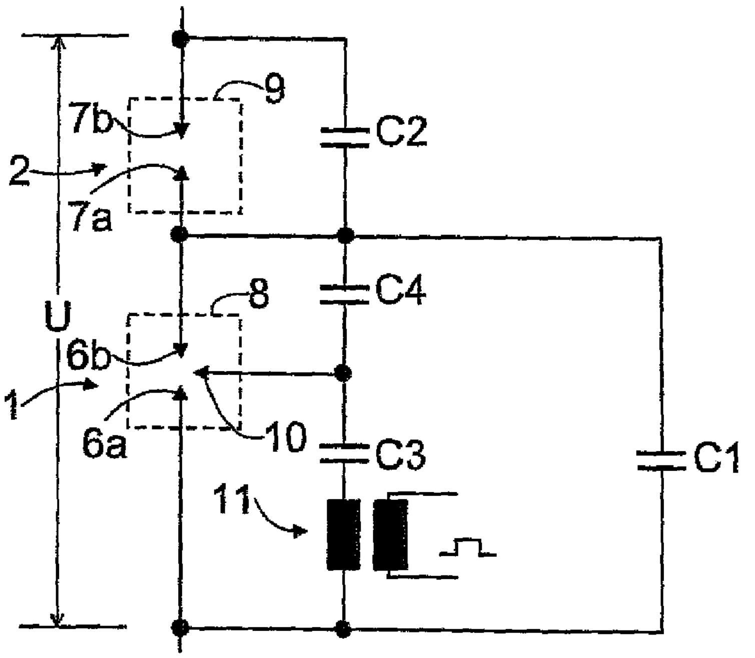
FIG. 3 shows a solution in accordance with a second embodiment of the invention for triggering a series spark gap.

Voltage distribution of the capacitors C3 and C4 may also be disturbed without the auxiliary spark gap 3. One solution of this kind is shown in FIG. 3. The solution of FIG. 3 corresponds mainly to that of FIG. 2, but instead of the auxiliary spark gap 3, a pulse transformer 11, for instance a Tesla transformer, is employed for disturbing the voltage distribution. The pulse transformer 11 is coupled in series with the capacitor C3. A trigger pulse is fed to a primary of the pulse transformer 11. To generate a trigger pulse for the primary it is possible to use an ignition coil or a semi-conductor switch, for instance, in a manner known per se. When the trigger pulse is fed to the pulse transformer 11, it produces a high-voltage pulse whose voltage is distributed to the capacitors C3 and C4. Because in parallel with these capacitors C3 and C4 there is a considerably greater capacitor C1, the voltage between the electrodes 6*a* and 6*b* will not change considerably, however. Disturbance of voltage distribution caused by the pulse transformer 11 results in triggering either the spark gap 6*a*-10 or the spark gap 6*b*-10, depending on the polarities of the momentary values of the pulse and the alternating voltage. The capacitor C3 or C4 in parallel with the spark gap that sparked over will discharge. Thus, because the capacitance in series connection of the capacitors C3 and C4 is lower than that of the capacitor C1, the voltage acting over the capacitor C1 does not decrease substantially. Said voltage thus acts over the spark gap that is between the additional electrode 10 and the main electrode 6*a* or 6*b* and that will also spark over. Further, as described in connection with FIG. 2, subsequently a spark-over will occur over the main electrodes 7*a* and 7*b* of the partial spark gap 2.

Figure 4:
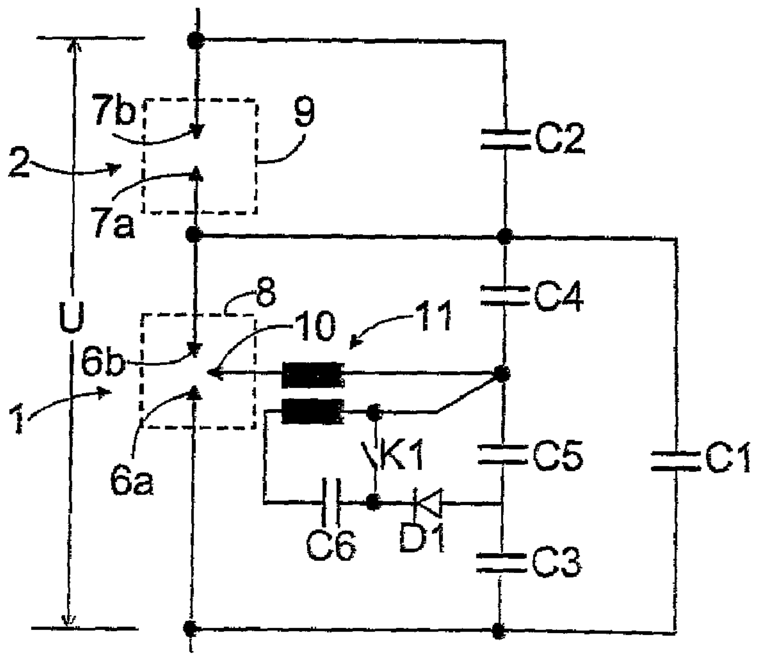
FIG. 4 shows a solution in accordance with a third embodiment of the invention for triggering a series spark gap.

Voltage level of the additional electrode 10 may also be changed by arranging the pulse transformer 11 between the midpoint of the capacitors and the additional electrode 10 as shown in FIG. 4. An advantage with this coupling is a lower voltage stress of the capacitors C3 and C4. The primary of the pulse transformer 11 may be against the ground, or it may be coupled to the midpoint of the capacitors as in FIG. 4. In the latter case the energy required for triggering the primary may be generated by utilizing auxiliary capacitors C5 and C6, a diode D1 and a switch K1 in accordance with FIG. 4.

The autoignition voltage of the spark gap depends on ambient conditions, such as temperature and air humidity. Thus, in practice, the autoignition voltage of the spark gap is not set so low as it could be set in theory. The autoignition voltage of the spark gap shall be higher than the one to which the metal oxide varistor limits the voltage. Typically this voltage, i.e. $U_{lim}$, is 2.3× nominal voltage $U_N$. Notation 2.3 pu (per unit) may also be used. In theory, the autoignition voltage of one spark gap 1 or 2 shall thus be higher than 0.5×2.3 pu. However, in order to prevent autoignition from occurring at an excessively low voltage, it was found that autoignition of the partial spark gap 1 and 2 occurring with value $0.75\times U_{lim}$ would provide a good safety factor/margin. In the presented solution the magnitude of a lower limit for the forced triggering, i.e. successful forced triggering, is determined by autoignition voltages of the partial spark gaps 1 and 2. Air temperature and air pressure are also to be considered. If the autoignition voltages of the partial spark gaps are set to value $0.75\times U_{lim}$, forced triggering of the series spark gap will still succeed the voltage being 1.73 pu, if $U_{lim}$ is 2.3 pu.

In some cases features set forth in the present document may be used as such, irrespective of other features. On the other hand, features set forth in the present document may be combined to provide various combinations.

The drawings and the relating description are only intended to illustrate the inventive idea. The details of the invention may vary within the scope of the claims. Consequently, the series spark gap may comprise two partial spark gaps in series as shown in the attached figures, or there may be a plurality of partial spark gaps in series. Instead of capacitors, the voltage distribution means may be, for instance, resistances or other adequate voltage distribution means. It is preferable, however, to use capacitors as the voltage distribution means, because their structure is relatively simple and additionally the switching can utilize their ability to store energy. Naturally one capacitor may be replaced by coupling a plurality of capacitors in parallel or in series in a corresponding manner.

The invention claimed is:

1. A method for triggering a series spark gap, in which there are in series at least two partial spark gaps, and supply voltage is distributed over the partial spark gaps by means of first capacitors the method comprising arranging an additional electrode in at least one partial spark gap between first and second main electrodes thereof, setting voltage of the additional electrode to a given level by means of second capacitors, arranging the capacitance of the second capacitors to be lower than the capacitance of the first capacitors and triggering the series spark gap by disturbing the voltage distribution of the second capacitors, whereby the spark gap between the first main electrode of the partial spark gap and the additional electrode will ignite, and consequently the voltage determined by the first capacitors acts over the spark gap that is between the additional electrode and the second main electrode of the partial spark gap and that will also ignite, which further leads to the fact that supply voltage acts over the second partial spark gap alone, and consequently a spark-over also occurs therein.

2. The method of claim 1, wherein disturbance of voltage distribution is carried out by short-circuiting the spark gap between the additional electrode and the main electrode.

3. The method of claim 2, wherein the short-circuit is implemented by means of a trigatron.

4. The method of claim 1, wherein the disturbance of the voltage distribution is carried out by means of a pulse transformer.

5. The method of claim 1, wherein the capacitance of the first capacitors is more than twice higher than the capacitance in series connection of the second capacitors.

6. The method of claim 1, wherein the capacitance of the first capacitors is more than five times higher than the capacitance in series connection of the second capacitors.

7. An arrangement for triggering a series spark gap, which series spark gap comprises at least two partial spark gaps in series, and which arrangement comprises first capacitors for distributing supply voltage over the partial spark gaps, an additional electrode arranged in at least one partial spark gap between main electrodes thereof, second capacitors for setting voltage of the additional electrode to a given level, the capacitance of the second capacitors being lower than the capacitance of the first capacitors, and means for disturbing voltage distribution of the second capacitors.

8. The arrangement of claim 7, further comprising means for short-circuiting the spark gap between the additional electrode and the main electrode.

9. The arrangement of claim 8, wherein the means for short-circuiting the spark gap between the additional electrode and the main electrode is a trigatron.

10. The arrangement of claim 7, further comprising a pulse transformer for feeding a current pulse to disturb the voltage distribution of the second voltage distribution means.

11. The arrangement of claim 7, wherein the capacitance of the first capacitors is more than twice higher than the capacitance in series connection of the second capacitors.

12. The arrangement of claim 7, wherein the capacitance of the first capacitors is more than five times higher than the capacitance in series connection of the second capacitors.

* * * * *